(12) United States Patent
Yokoyama et al.

(10) Patent No.: US 9,614,197 B2
(45) Date of Patent: Apr. 4, 2017

(54) ONBOARD BATTERY

(71) Applicant: FUJI JUKOGYO KABUSHIKI KAISHA, Tokyo (JP)

(72) Inventors: Yutaka Yokoyama, Tokyo (JP); Isao Nakagawa, Tokyo (JP); Toshiyuki Hara, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 14/625,479

(22) Filed: Feb. 18, 2015

(65) Prior Publication Data

US 2015/0244035 A1 Aug. 27, 2015

(30) Foreign Application Priority Data

Feb. 21, 2014 (JP) ................. 2014-031899

(51) Int. Cl.
| | | |
|---|---|---|
| *H01M 2/02* | (2006.01) | |
| *H01M 2/10* | (2006.01) | |
| *H01M 10/625* | (2014.01) | |
| *H01M 10/615* | (2014.01) | |
| *H01M 10/6571* | (2014.01) | |
| *H01M 10/6563* | (2014.01) | |

(Continued)

(52) U.S. Cl.
CPC ....... *H01M 2/0277* (2013.01); *H01M 2/1077* (2013.01); *H01M 10/615* (2015.04); *H01M 10/625* (2015.04); *H01M 10/6571* (2015.04); *H01M 10/613* (2015.04); *H01M 10/658* (2015.04); *H01M 10/6563* (2015.04); *H01M 2220/20* (2013.01)

(58) Field of Classification Search
CPC ............. H01M 10/615; H01M 10/625; H01M 10/6552; H01M 10/6556; H01M 10/6571
USPC ........................................................ 181/68.5
See application file for complete search history.

(56) References Cited

U.S. PATENT DOCUMENTS

| 5,620,057 A | 4/1997 | Klemen et al. |
|---|---|---|
| 2006/0132101 A1 | 6/2006 | Ambrosio et al. |

(Continued)

FOREIGN PATENT DOCUMENTS

| CN | 101499546 A | 8/2009 |
|---|---|---|
| CN | 201975488 U | 9/2011 |

(Continued)

OTHER PUBLICATIONS

Office Action Chinese Patent Application No. 201510082438.3 dated Dec. 2, 2016.

*Primary Examiner* — Maria J Laios
*Assistant Examiner* — Robert S Carrico
(74) *Attorney, Agent, or Firm* — McDermott Will & Emery LLP

(57) ABSTRACT

An onboard battery includes an accommodation case that has a hollow cross section formed with multiple cavities 9a, and at least one battery module that has at least one battery cell and is accommodated in the accommodation case. At least one disposition depression that communicates with one of the multiple cavities and is opened upward is formed in a portion positioned below the at least one battery module in the accommodation case, and at least one heater that heats the at least one battery cell is disposed in the at least one disposition depression so as not to be in contact with the at least one battery cell.

18 Claims, 8 Drawing Sheets

(51) Int. Cl.
*H01M 10/613* (2014.01)
*H01M 10/658* (2014.01)

(56) References Cited

U.S. PATENT DOCUMENTS

| | | | |
|---|---|---|---|
| 2008/0198897 A1* | 8/2008 | Suzuki | G01K 13/00 374/152 |
| 2010/0047682 A1* | 2/2010 | Houchin-Miller | H01M 2/1077 429/120 |
| 2013/0017422 A1 | 1/2013 | Bae et al. | |

FOREIGN PATENT DOCUMENTS

| | | |
|---|---|---|
| JP | 11-176487 A | 7/1999 |
| JP | 2008-053149 A | 3/2008 |
| JP | 2010-173536 A | 8/2010 |
| JP | 2011-108609 A | 6/2011 |
| JP | 2012-015096 A | 1/2012 |
| JP | 2013-539161 A | 10/2013 |
| WO | 2012/013583 A1 | 2/2012 |

* cited by examiner

ONBOARD BATTERY

CROSS-REFERENCE TO RELATED APPLICATIONS

The present application claims priority from Japanese Patent Application No. 2014-031899 filed on Feb. 21, 2014, the entire contents of which are hereby incorporated by reference.

BACKGROUND

1. Technical Field

The present invention relates to the technical field of an onboard battery that is mounted in a vehicle such as an automobile and can be used even in a cold area.

2. Related Art

In various vehicles such as an automobile, an onboard battery for supplying electric power to a motor and various electrical components is mounted.

In recent years, vehicles such as, in particular, electric vehicle (EV), hybrid electric vehicle (HEV), and plug-in hybrid electric vehicle (PHEV) are becoming pervasive, and an onboard battery having a high power storage function is mounted on these vehicles that use electricity as power.

The onboard battery is constituted by a plurality of battery modules, and the battery module is constituted by, e.g., a battery stack in which each of a plurality of battery cells (secondary battery) such as a nickel-metal hydride battery and a lithium ion battery and a separator disposed between the battery cells for securing a cooling path are alternately stacked on each other, a fixing member that fastens the battery stack in a stacking direction, a bus bar module that electrically connects the battery cells to each other, and a chamber that sends cooling air to portions between the battery cells.

The output performance of the batter cell used in the onboard battery described above changes depending on temperatures, and the output performance of the battery cell is reduced when the temperature is low. Consequently, with regard to the onboard battery used in a cold area, there is a possibility that sufficient electric power is not supplied to a motor or the like from the onboard battery when the temperature is low such as during winter season and an output required in the motor or the like cannot be obtained.

To cope with this, some onboard batteries used in the cold area are provided with a heater, the battery cell is heated using the heater when the temperature is low, and the output performance of the battery cell is thereby enhanced (see, e.g., Japanese Unexamined Patent Application Publication (JP-A) No. H11-176487).

In the onboard battery described in JP-A No. H11-176487, tubular cell accommodation units are provided in an accommodation case, and the battery cell is inserted into and disposed in each cell accommodation unit. A heater (Peltier device) is inserted into and disposed in a gap formed between the cell accommodation units, the heater is driven with a current supplied thereto when the temperature is low, and the battery cell is heated using the heater.

However, in the onboard battery described in JP-A No. H11-176487, the battery cell is disposed inside the cell accommodation unit and the heater is disposed outside the cell accommodation unit, and hence the cell accommodation unit is present between the battery cell and the heater and the efficiency of heating to the battery cell by the heater may be reduced.

In addition, the battery cell and the heater are positioned inside and outside the cell accommodation unit so that the weight of the battery cell is applied to the heater as a load via the cell accommodation unit, and thus damage to the heater may occur. In particular, the weight of the battery cell may be applied to the heater as a large load via the cell accommodation unit due to vibrations generated during running of the vehicle.

SUMMARY OF THE INVENTION

An object of the present invention is to solve the above problem, achieve an improvement in the efficiency of heating to the battery cell by the heater, and prevent the occurrence of the damage to the heater.

An aspect of the present invention provides an onboard battery including: an accommodation case that has a hollow cross section formed with multiple cavities; at least one battery module that has at least one battery cell and is accommodated in the accommodation case; at least one disposition depression that communicates with one of the multiple cavities and is opened upward is formed in a portion positioned below the at least battery module in the accommodation case, and at least heater that heats the at least battery cell is disposed in the at least disposition depression so as not to be in contact with the at least battery cell.

A heater electric wire that supplies a current to the at least one heater may be disposed in the one of the multiple cavities positioned below the at least one heater.

A heat insulating material may be disposed in the one of the multiple cavities.

The heat insulating material may be disposed in the one of the multiple cavities positioned below the at least one heater.

A pair of attachment grooves that are opened in a direction in which the attachment grooves face each other may be formed in the at least one disposition depression, both ends of the at least one heater may be slid and inserted into the pair of the attachment grooves, and the at least one heater may be thereby disposed in the at least one disposition depression.

The heater may be formed into a flat shape that faces in an vertical direction.

With this, the heat generation area of the heater is increased.

A cooling fan that causes cooling air to flow may be provided in the at least one battery module, and driving of the cooling fan may be stopped when the at least one heater is driven.

DETAILED DESCRIPTION

Figure 1:
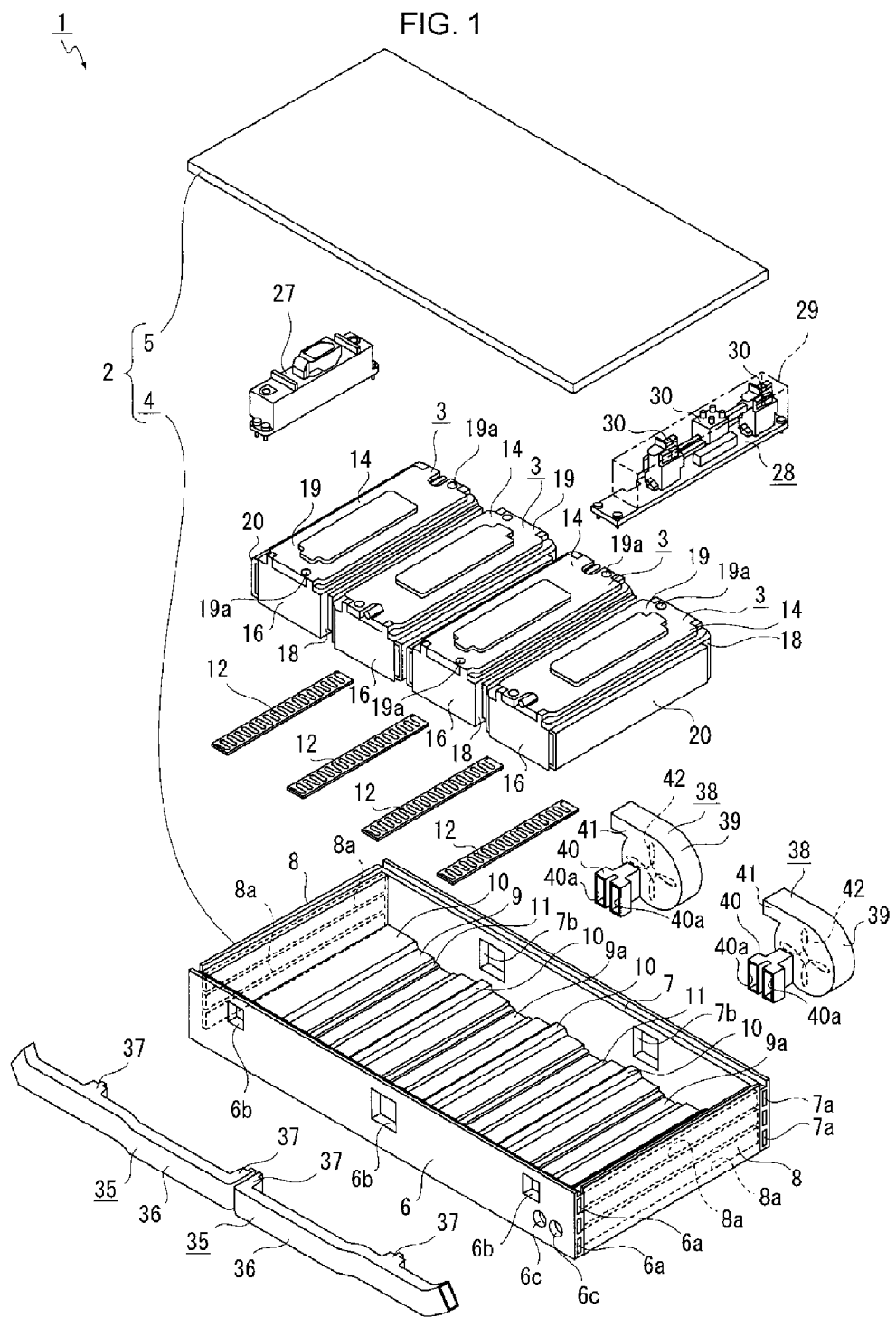
FIG. 1 illustrates an implementation of the onboard battery of the present invention together with FIGS. 2 to 8, and is a schematic exploded perspective view of the onboard battery.

Hereinbelow, an implementation for carrying out an onboard battery of the present invention will be described with reference to the accompanying drawings.

An onboard battery 1 has an accommodation case 2 and battery modules 3, 3, . . . (see FIGS. 1 and 2). The onboard battery 1 is disposed, e.g., above a vehicle body floor of a trunk or the like behind a rear seat of a vehicle.

The accommodation case 2 has an accommodation unit 4 that is opened upward and a flat lid 5 that closes the opening of the accommodation unit 4 from above.

The accommodation unit 4 has a front wall 6 that faces in a front and rear direction, a rear wall 7 that is positioned on the rear side of the front wall 6 and faces in the front and rear direction, side walls 8 and 8 that are positioned so as to be spaced part from each other in a left and right direction, and a bottom wall 9 that faces in an vertical direction. Each of the front wall 6, the rear wall 7, the side walls 8 and 8, and the bottom wall 9 is formed by extrusion molding of aluminum or the like, and has a hollow cross section.

Cavities 6a, 6a, and 6a that extend in the left and right direction and are arranged in the vertical direction are formed in the front wall 6, and cavities 7a, 7a, and 7a that extend in the left and right direction and are arranged in the vertical direction are formed in the rear wall 7. Cavities 8a, 8a, . . . that extend in the front and rear direction and are arranged in the vertical direction are formed in the individual side walls 8 and 8. Duct insertion holes 6b, 6b, and 6b are formed in the front wall 6 so as to be spaced apart from each other in the left and right direction. Cable insertion holes 6c and 6c are formed in one end of the front wall 6 in the left and right direction. Duct insertion holes 7b and 7b are formed in the rear wall 7 so as to be spaced apart from each other in the left and right direction.

Figure 3:
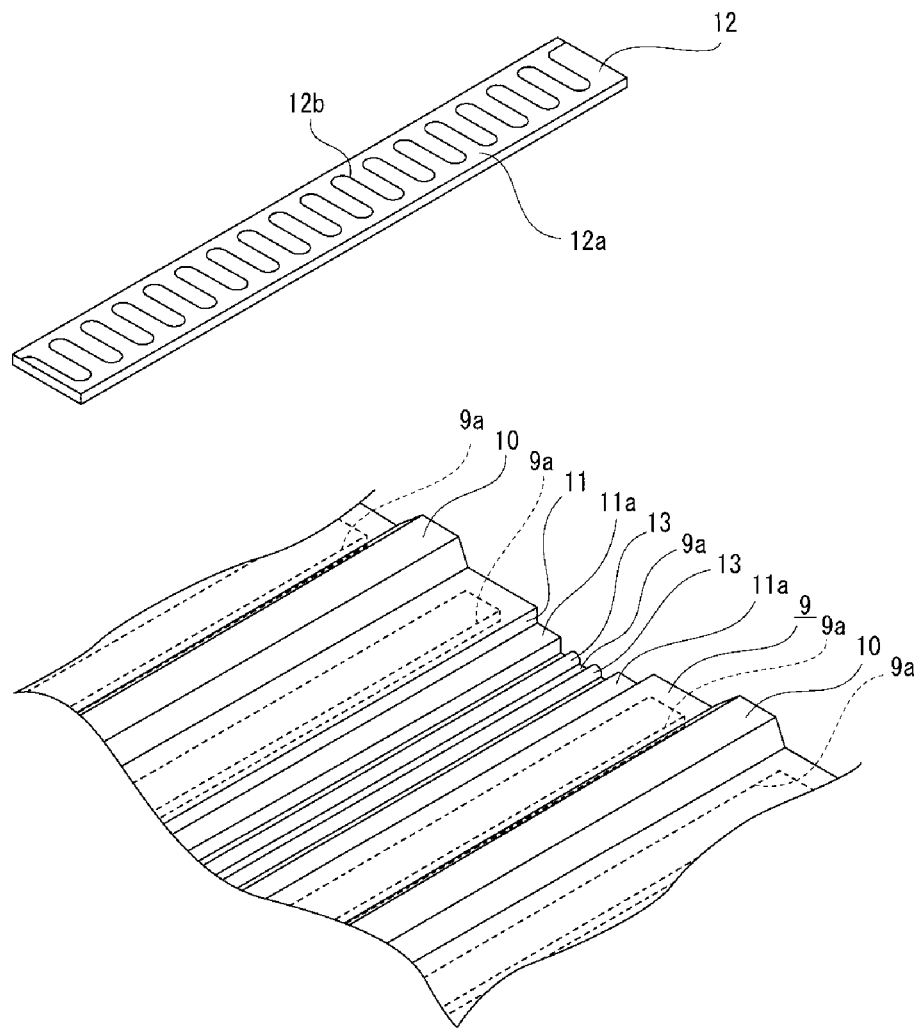
FIG. 3 is an enlarged perspective view of a bottom wall in an accommodation case and a heater disposed on the bottom wall.

Cavities 9a, 9a, . . . that extend in the front and rear direction and are arranged in the left and right direction are formed in the bottom wall 9 (see FIG. 3). Disposition depressions 11, 11, . . . are formed in the bottom wall 9 above the predetermined cavities 9a, 9a, . . . . The disposition depressions 11, 11, . . . are opened upward, communicate with the cavities 9a, 9a, . . . , and are formed at positions that are spaced apart from each other at regular intervals in the left and right direction. For example, four disposition depressions 11, 11, . . . are formed. A portion of the disposition depression 11 other than portions thereof on left and right sides communicates with the cavity 9a, and placement surfaces 11a and 11a that face upward are formed on the portions of the disposition depression 11 on the left and right sides.

Partition protrusions 10, 10, . . . that extend in the front and rear direction are provided on the upper surface side of the bottom wall 9 so as to be spaced apart from each other in the left and right direction. The partition protrusions 10, 10, . . . are protruded upward, and one disposition depression 11 is formed between the partition protrusions 10 and 10.

In the individual disposition depressions 11, 11, . . . , heaters 12, 12, . . . are disposed. The heater 12 is disposed in the disposition depression 11 by placing left and right ends of the heater 12 on the placement surfaces 11a and 11a. The heater 12 is formed into a flat shape that faces in the vertical direction and extends in the front and rear direction, and is formed by, e.g., burying a heating wire 12b in a resin base 12a.

Note that, as the heater 12, it is possible to use, e.g., a positive temperature coefficient (PTC) heater that controls a heat radiation amount by detecting an ambient temperature.

In a state in which the heater 12 is disposed in the disposition depression 11, the upper surface of the heater 12 is positioned slightly below the upper surface of the bottom wall 9, and the heater 12 is not protruded upward from the bottom wall 9.

In the cavity 9a that communicates with the disposition depression 11 in which the heater 12 is disposed, heater electric wires 13 and 13 for supplying a current to the heater 12 are disposed. Consequently, the heater electric wires 13 and 13 are covered with the heater 12 from above.

Figure 2:
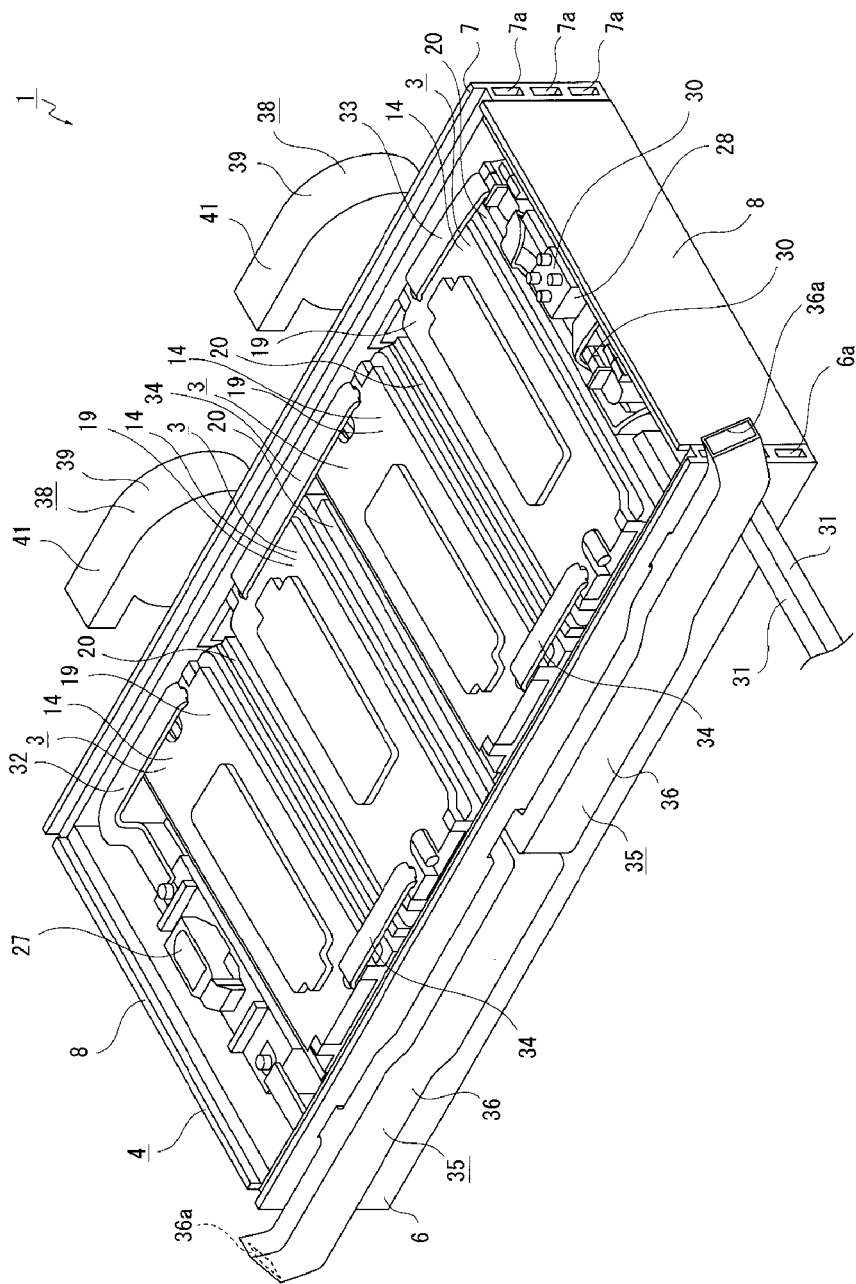
FIG. 2 is a perspective view of the onboard battery.

The battery modules 3, 3, . . . are accommodated in the accommodation case 2 such that, e.g., the four battery modules are arranged in the left and right direction (see FIGS. 1 and 2).

The battery module 3 has a cell cover 14 and a plurality of battery cells 15, 15, . . . that are arranged in the front and rear direction in the cell cover 14.

Figure 4:
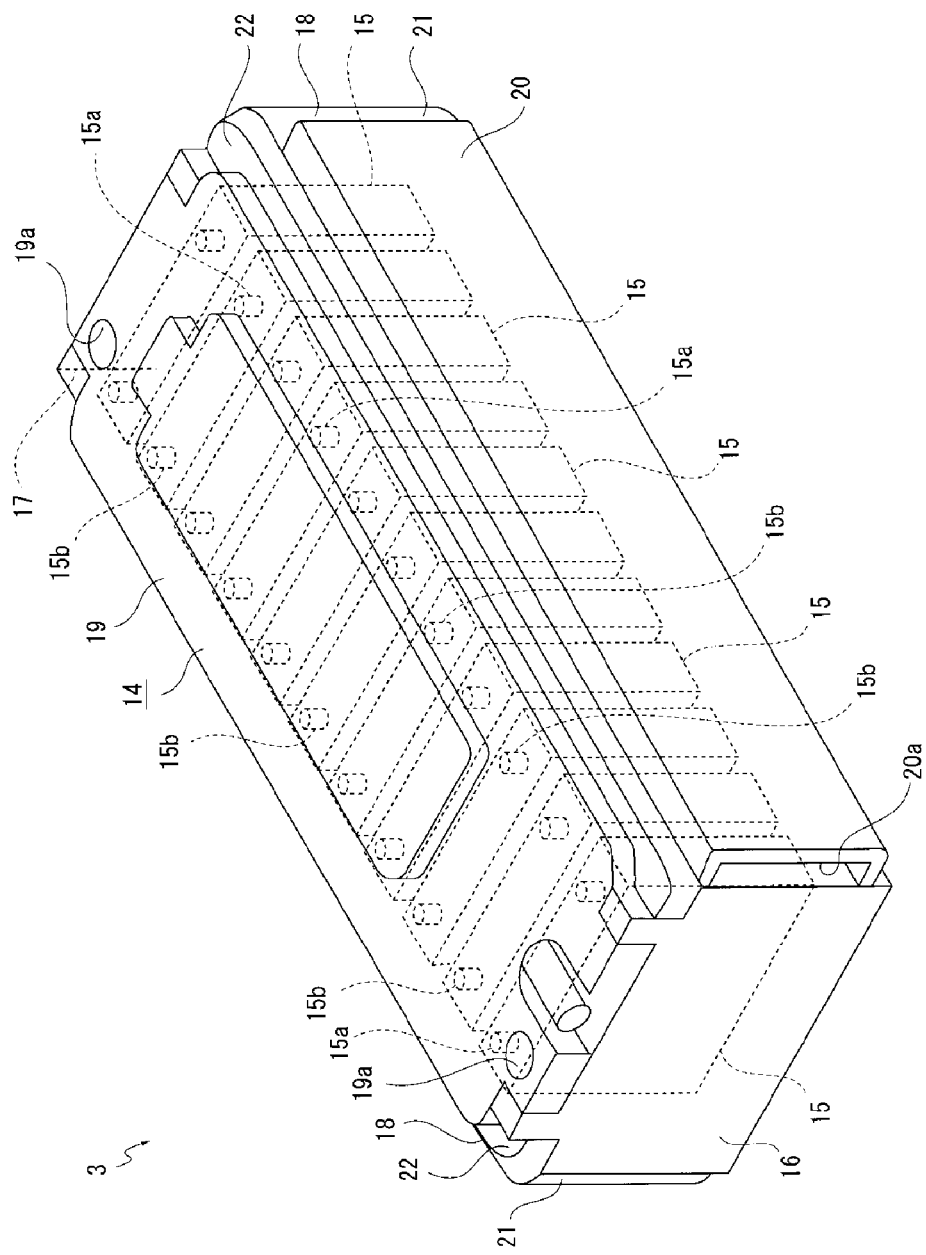
FIG. 4 is a perspective view of a battery module.
Figure 5:
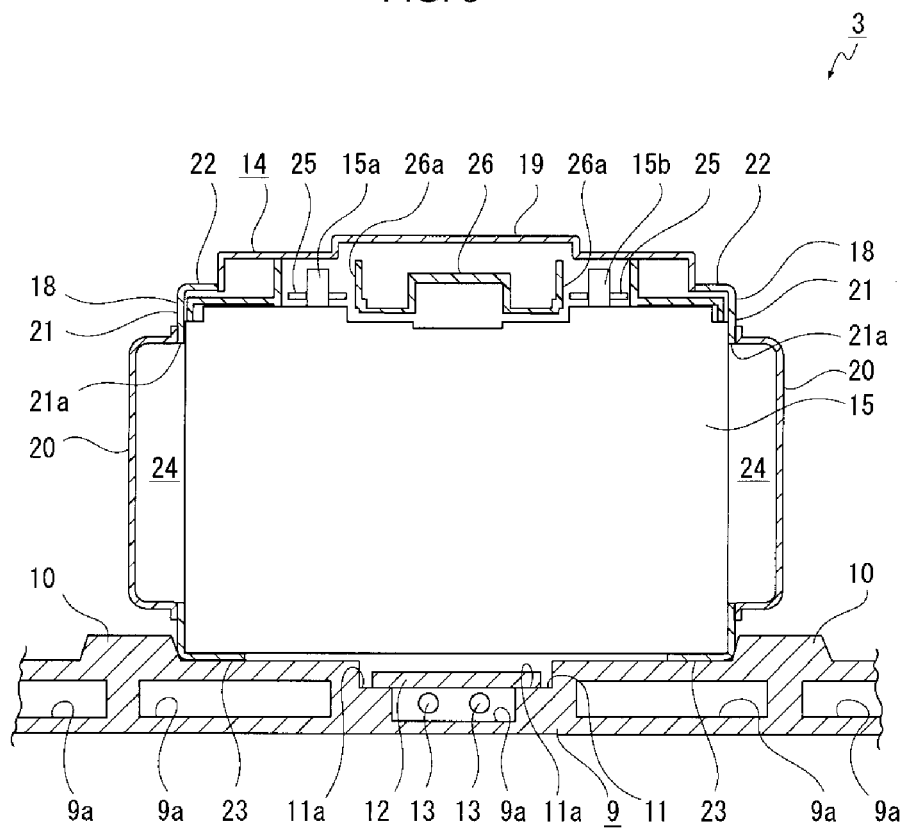
FIG. 5 is a cross-sectional view illustrating a state in which the battery module is disposed on the bottom wall.

As illustrated in FIGS. 4 and 5, the cell cover 14 has a front surface 16 that faces in the front and rear direction, a rear surface 17 that is positioned on the rear side of the front surface 16 and faces in the front and rear direction, side surfaces 18 and 18 that are positioned so as to be spaced apart from each other in the left and right direction, a top surface 19 that faces in the vertical direction, and chamber formation units 20 and 20 that are attached to the side surfaces 18 and 18.

The side surfaces 18 and 18 have attachment surfaces 21 and 21 that face in the left and right direction, upper protruded surfaces 22 and 22 that are protruded from the upper edges of the attachment surfaces 21 and 21 in a direction in which they approach each other in the left and right direction, and lower protruded surfaces 23 and 23 that are protruded from the lower edges of the attachment surfaces 21 and 21 in a direction in which they approach each other in the left and right direction. An opening 21a that extends through the attachment surface 21 in the left and right direction is formed in a portion of the attachment surface 21 other than its outer periphery.

The chamber formation unit 20 is formed into a box-like shape having openings on its side and one of the front and the rear, and an opening edge of the chamber formation unit 20 in the left and right direction is attached to the outer periphery of the attachment surface 21. By attaching the chamber formation units 20 and 20 to the outer peripheries of the attachment surfaces 21 and 21, spaces are formed on left and right sides in the cell cover 14, and these spaces are formed as chambers 24 and 24. The opening of one of the front and the rear of the chamber formation unit 20 is formed as a coupling opening 20a.

In both ends of the top surface 19, insertion holes 19a and 19a that extend through the top surface 19 in the vertical direction are formed.

Figure 6:
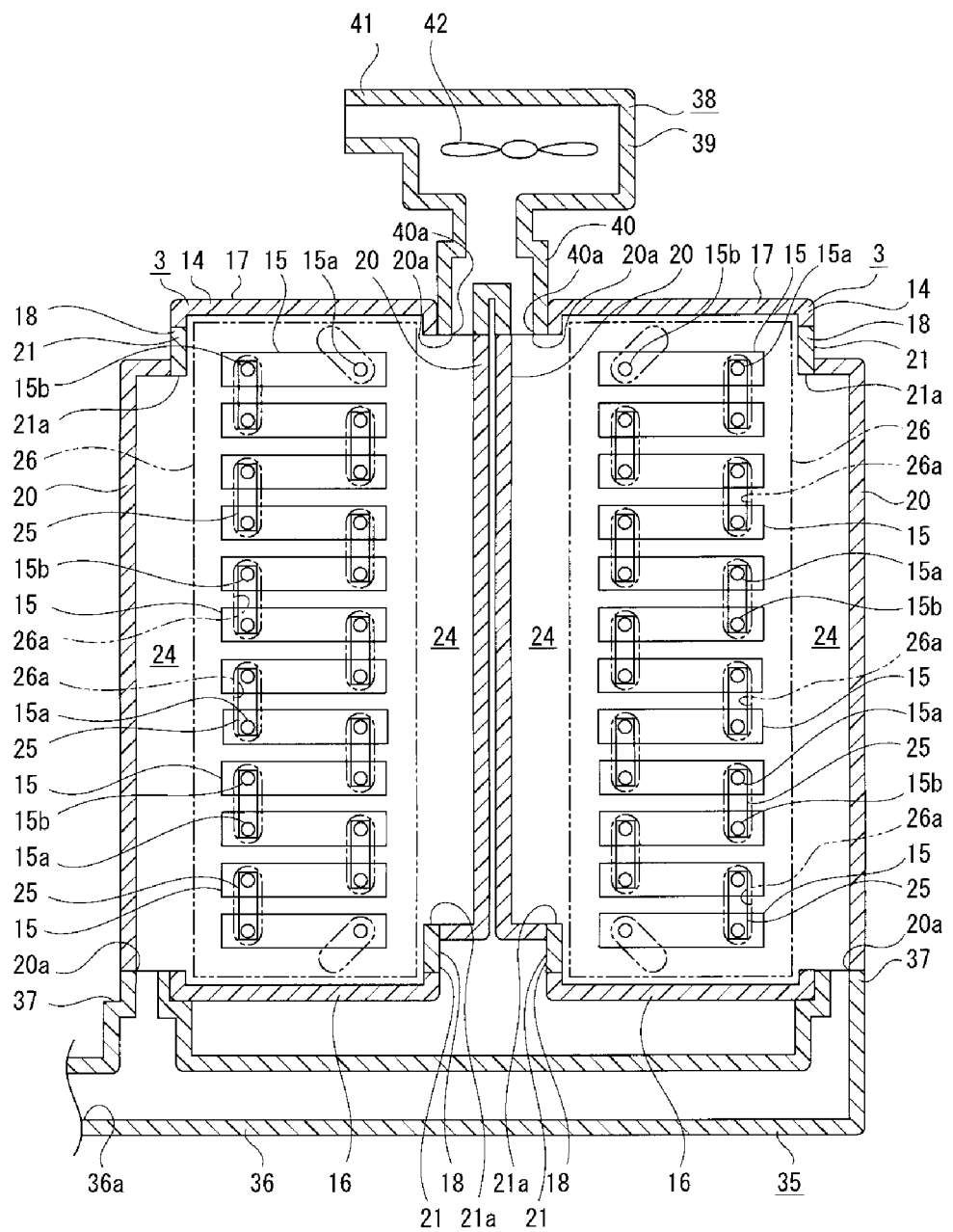
FIG. 6 is a conceptual view illustrating the battery module with a top surface detached together with ducts.

Each of the battery cells 15, 15, . . . is held by the cell cover 14 with the right and left ends of the battery cell 15 placed on the lower protruded surfaces 23 and 23 of the side surfaces 18 and 18, and the battery cells 15, 15, . . . are arranged at regular intervals in a state in which each battery cell 15 has small gaps at the front and the rear thereof (see FIG. 6). A positive electrode terminal 15a and a negative electrode terminal 15b that are protruded upward are provided in the battery cell 15 so as to be spaced apart from each other in the left and right direction. The positive electrode terminals 15a, 15a, . . . and the negative electrode terminals 15b, 15b, . . . that are positioned adjacent to each other in the front and rear direction are connected to each other with connection plates 25, 25, . . . each having conductivity, and the battery cells 15, 15, . . . are thereby connected in series to each other.

A holding plate 26 is attached to the upper surfaces of the battery cells 15, 15, . . . below the top surfaces 19 (see FIGS. 5 and 6). Disposition holes 26a, 26a, . . . that extend in the front and rear direction are formed in the holding plate 26 so as to be spaced part from each other in the front and rear direction and in the left and right direction. The positive electrode terminal 15a and the negative electrode terminal 15b of the battery cells 15 and 15 that are positioned adjacent to each other in the front and rear direction, and the connection plate 25 that connects the positive electrode terminal 15a and the negative electrode terminal 15b to each other are disposed in the disposition hole 26a.

A plug sensor box 27 and a junction box 28 are accommodated in left and right ends of the accommodation case 2 (see FIGS. 1 and 2). In addition, a battery control unit (not illustrated) that controls the entire onboard battery 1 is disposed in the accommodation case 2.

A predetermined connection plug and a predetermined sensor are disposed in the plug sensor box 27.

The junction box 28 has a cabinet 29 formed into a rectangular shape and control components 30, 30, . . . that are disposed in the cabinet 29 and control the current and the like. As the control components 30, 30, . . . , for example, a relay, a fuse, a connector terminal, and the like are provided. One ends of cables 31 and 31 passing through the cable insertion holes 6c and 6c in the front wall 6 are connected with the junction box 28, and the junction box 28 is connected to a power supply circuit (inverter) (not illustrated) mounted below the floor of the vehicle with the cables 31 and 31.

The battery modules 3, 3, . . . are inserted between the plug sensor box 27 and the junction box 28 and are accommodated in the accommodation case 2. The battery modules 3, 3, . . . are disposed at positions defined by the partition protrusions 10, 10, . . . provided on the bottom wall 9 of the accommodation case 2 in a state in which the battery modules 3, 3, . . . are placed on the upper surface of the bottom wall 9 (see FIG. 5). Consequently, the heaters 12, 12, . . . that are disposed in the disposition depressions 11, 11, . . . are positioned immediately below the battery cells 15, 15, . . . . At this point, since the upper surface of the heater 12 is positioned slightly below the upper surface of the bottom wall 9 and the heater 12 is not protruded upward from the bottom wall 9, the battery cells 15, 15, . . . are not in contact with the heaters 12, 12, . . . , and specific gaps are formed between the lower surfaces of the battery cells 15, 15, . . . and the upper surfaces of the heaters 12, 12, . . . .

As described above, in the state in which the battery modules 3, 3, . . . , the plug sensor box 27, and the junction box 28 are accommodated in the accommodation case 2, the battery cell 15 of the battery module 3 positioned adjacent to the plug sensor box 27 is connected to the plug sensor box 27 with a first connection bus bar 32, and the battery cell 15 of the battery module 3 positioned adjacent to the junction box 28 is connected to the junction box 28 with a second connection bus bar 33. One end of the first connection bus bar 32 and one end of the second connection bus bar 33 are inserted into the insertion holes 19a and 19a formed in the top surfaces 19 and 19 of the battery modules 3 and 3, and are connected with the positive electrode terminals 15a and 15a or the negative electrode terminals 15b and 15b of the battery cells 15 and 15.

In addition, the battery cells 15, 15, . . . of the adjacent battery modules 3, 3, . . . are connected to each other with direct current connection bus bars 34, 34, . . . . Both ends of the direct current connection bus bars 34, 34, . . . are inserted into the insertion holes 19a, 19a, . . . formed in the top surfaces 19, 19, . . . of the battery modules 3, 3, . . . , and are connected with the positive electrode terminals 15a, 15a, . . . or the negative electrode terminals 15b, 15b, . . . of the battery cells 15, 15, . . . .

Note that the plug sensor box 27 and the junction box 28 are connected to predetermined portions of the battery control unit or the like with electric wires and bus bars.

Intake ducts 35 and 35 are provided on the front surface side of the battery modules 3, 3, . . . so as to be arranged in the left and right direction. The intake duct 35 has an intake unit 36 that extends in the left and right direction and couplers 37 and 37 that are protruded rearward from the intake unit 36. An intake opening 36a is formed in an end surface of the intake unit 36 on the outside, and inflow openings (not illustrated) are formed in rear end surfaces of the couplers 37 and 37.

In the intake ducts 35 and 35, the intake units 36 and 36 are positioned on the front side of the front wall 6 in the accommodation case 2, the couplers 37, 37, . . . are inserted into the duct insertion holes 6b, 6b, and 6b formed in the front wall 6, and the rear ends of the couplers 37, 37, . . . are coupled to the front ends of the chamber formation units 20, 20, . . . in the battery modules 3, 3, . . . (see FIG. 6). Consequently, the inflow openings of the couplers 37, 37, . . . communicate with the coupling openings 20a, 20a, . . . of the chamber formation units 20, 20, . . . , and cooling air taken in from the intake openings 36a and 36a is sent to the chambers 24, 24, . . . formed in the battery modules 3, 3, . . . via the intake ducts 35 and 35. The cooling air sent to the chambers 24, 24, . . . is flown to the chambers 24, 24, . . . on the opposite side through gaps between the battery cells 15, 15, . . . .

On the rear surface side of the battery modules 3, 3, . . . , discharge ducts 38 and 38 are provided so as to be spaced apart from each other in the left and right direction (see FIGS. 1 and 2). The discharge duct 38 has a fan disposition unit 39 having a substantially circular shape, a coupling protrusion 40 that is protruded forward from the fan disposition unit 39, and a discharge unit 41 that is laterally protruded from the fan disposition unit 39. The front end of the coupling protrusion 40 is divided into two portions, and outflow openings 40a and 40a that are arranged in the left and right direction are formed in the front end surfaces of the two portions. An discharge opening (not illustrated) is formed in the tip surface of the discharge unit 41.

A cooling fan 42 is rotatably disposed in the fan disposition unit 39. The cooling fan 42 has the function of flowing the cooling air from the side of the coupling protrusion 40 to the side of the discharge unit 41 by the rotation of the cooling fan 42.

In the discharge ducts 38 and 38, the fan disposition units 39 and 39 and the discharge units 41 and 41 are positioned on the rear side of the rear wall 7 in the accommodation case 2, the coupling protrusions 40 and 40 are inserted into the duct insertion holes 7b and 7b formed in the rear wall 7, and the front ends of the coupling protrusions 40 and 40 are coupled to the rear ends of the chamber formation units 20, 20, . . . in the battery modules 3, 3, . . . (see FIG. 6).

Consequently, the outflow openings 40a, 40a, . . . of the coupling protrusions 40 and 40 communicate with the coupling openings 20a, 20a, . . . of the chamber formation units 20, 20, . . . , and the cooling air that has cooled the battery cells 15, 15, . . . is discharged from the discharge openings via the discharge ducts 38 and 38 through the chambers 24, 24, . . . .

The flow of the cooling air in the intake ducts 35 and 35, the battery modules 3, 3, . . . , and the discharge ducts 38 and 38 is forcibly carried out by the cooling fans 42 and 42, and the battery cells 15, 15, . . . are thereby cooled efficiently.

In the onboard battery 1 configured as described above, the current is supplied to the heaters 12, 12, . . . via the heater electric wires 13, 13, . . . when temperature is low, the heating wires 12b, 12b, . . . are caused to generate heat, air in the battery module 3 is warmed, and the battery cells 15, 15, . . . positioned immediately above the heaters 12, 12, . . . are heated. At this point, the cooling fans 42 and 42 are not rotated such that the battery cells 15, 15, . . . are not cooled.

Thus, by not rotating the cooling fans 42 and 42 when the heaters 12, 12, . . . are driven, the flow of the air that is warmed by the heaters 12, 12, . . . and heats the battery cells 15, 15, . . . in the battery module 3 is suppressed, and hence it is possible to achieve an improvement in the efficiency of heating to the battery cells 15, 15, . . . by the heaters 12, 12, . . . .

The temperature of each of the battery cells 15, 15, . . . heated by the heaters 12, 12, . . . is increased, the output performance thereof is improved, and a high power storage function is secured.

As described above, in the onboard battery 1, the disposition depressions 11, 11, . . . that communicate with the cavities 9a, 9a, . . . and are opened upward are formed in the portions positioned below the battery modules 3, 3, . . . in the accommodation case 2, and the heaters 12, 12, . . . that heat the battery cells 15, 15, . . . are disposed in the disposition depressions 11, 11, . . . so as not to be in contact with the battery cells 15, 15, . . . .

Consequently, the battery cells 15, 15, . . . and the heaters 12, 12, . . . are positioned so as to oppose each other with space interposed therebetween, and hence it is possible to achieve an improvement in the efficiency of heating to the battery cells 15, 15, . . . by the heaters 12, 12, . . . , and the loads of the battery cells 15, 15, . . . are not applied to the heaters 12, 12, . . . so that it is possible to prevent the occurrence of the damage to the heaters 12, 12, . . . .

In addition, air is present between the battery cells 15, 15, . . . and the heaters 12, 12, . . . , and hence a local increase in the temperature of the battery cells 15, 15, . . . by the heaters 12, 12, . . . is suppressed and it is possible to heat the entire battery cells 15, 15, . . . .

Further, air heated by the heaters 12, 12, . . . is likely to rise, and hence, by positioning the heaters 12, 12, . . . immediately below the battery cells 15, 15, . . . , it is possible to achieve a further improvement in the efficiency of heating to the battery cells 15, 15, . . . by the heaters 12, 12, . . . .

Furthermore, the heater electric wires 13 and 13 are disposed in the cavity 9a positioned below the heater 12, and hence the cavity 9a is used as the disposition space for the heater electric wires 13 and 13, it is not necessary to additionally form the disposition space for the heater electric wires 13 and 13 in the accommodation case 2, and it is possible to achieve a reduction in the size of the onboard battery 1 through effective use of the space.

Additionally, the heater 12 is formed into the flat shape facing in the vertical direction, and hence a heat generation area of the heater 12 is increased, and it is possible to achieve a further improvement in the efficiency of heating to the battery cell 15 by the heater 12.

Figure 7:
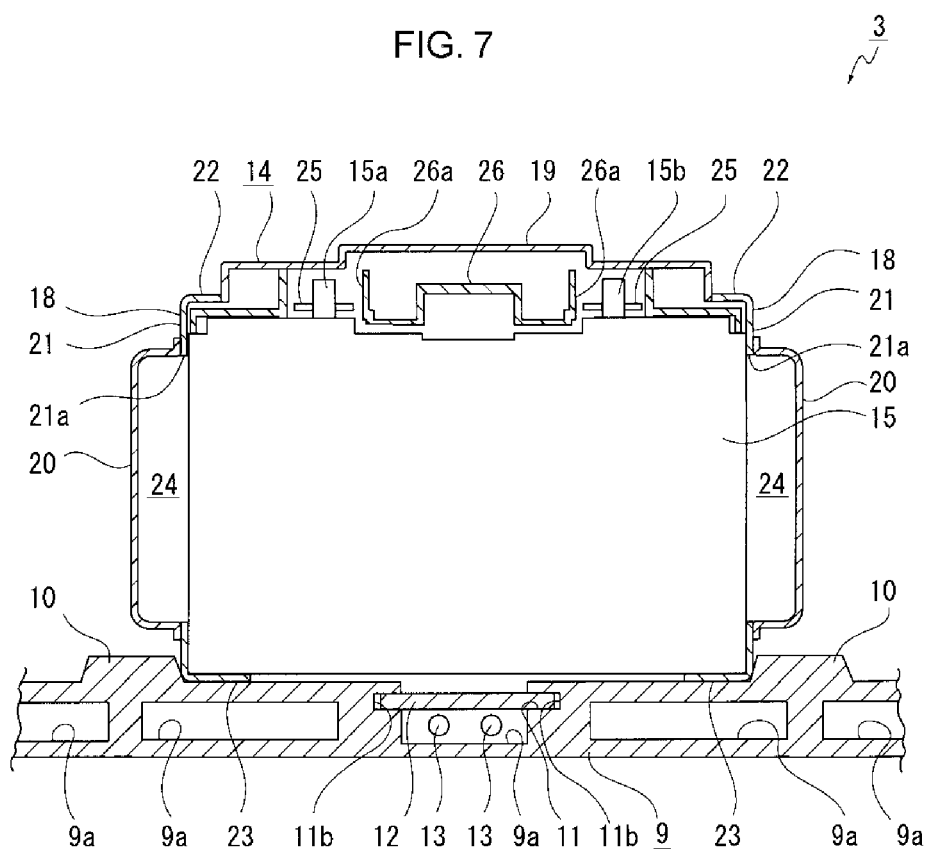
FIG. 7 is a cross-sectional view illustrating a modification related to disposition of the heater.

Note that the foregoing has described an example in which the placement surfaces 11a and 11a are formed in the disposition depression 11 positioned above the cavity 9a and the heater 12 is disposed in the disposition depression 11 by being placed on the placement surfaces 11a and 11a. However, as illustrated in FIG. 7, it is also possible to form a pair of attachment grooves 11b and 11b that are opened in a direction in which they face each other in the disposition depression 11, and dispose the heater 12 in the disposition depression 11 by sliding the heater 12 into the attachment grooves 11b and 11b from the front or the rear.

Thus, by disposing the heater 12 in the disposition depression 11 by sliding the heater 12 into the attachment grooves 11b and 11b, the heater 12 is inserted into the attachment grooves 11b and 11b by the sliding and is held, and hence it is possible to achieve an improvement in workability in an attachment work of the heater 12 to the accommodation case 2, and a unit and a work for fixing the heater 12 to the accommodation case 2 become unnecessary so that it is possible to simplify the structure and achieve a further improvement in workability.

Figure 8:
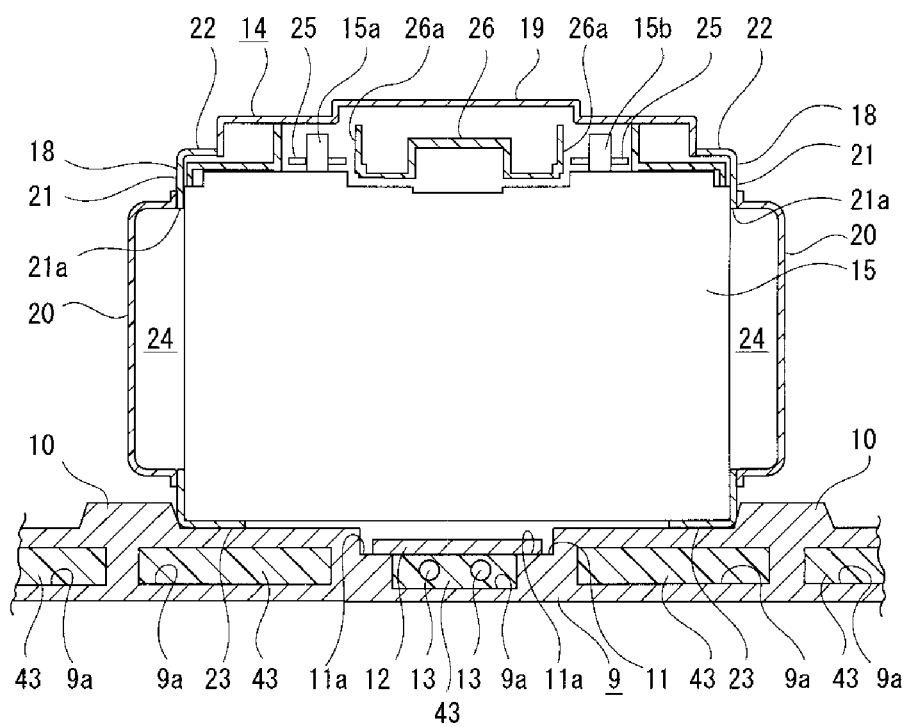
FIG. 8 is a cross-sectional view illustrating an example in which a heat insulating material is disposed in a cavity.

In addition, the cavities 9a, 9a, . . . formed in the bottom wall 9 of the accommodation case 2 may be filled with heat insulating materials 43, 43, . . . (see FIG. 8).

By disposing the heat insulating materials 43, 43, . . . in the cavities 9a, 9a, . . . , the radiation of heat from the heaters 12, 12, . . . to the outside of the accommodation case 2 is suppressed, and it is possible to achieve an improvement in the efficiency of heating to the battery cells 15, 15, . . . by the heaters 12, 12, . . . .

In particular, by disposing the heat insulating material 43 in the cavity 9a positioned below the heater 12, the radiation of heat from the heater 12 to the outside of the accommodation case 2 is efficiently suppressed, and it is possible to achieve an improvement in the efficiency of heating to the battery cell 15 by the heater 12 without increasing the cost.

The invention claimed is:

1. An onboard battery comprising:
   an accommodation case that has an accommodation unit comprising a front wall, a rear wall, two side walls and a bottom wall, the bottom wall having a hollow cross section formed with multiple cavities at least in the bottom wall; and
   at least one battery module that has at least one battery cell and is accommodated in the accommodation case, wherein
   at least one disposition depression that communicates with one of the multiple cavities formed in the bottom wall and is opened upward is formed in a portion positioned below the at least one battery module in the accommodation case, and
   at least one heater that heats the at least one battery cell is disposed in the disposition depression so as not to be in contact with the battery cell.

2. The onboard battery according to claim 1, wherein a heater electric wire that supplies a current to the at least one heater is disposed in the one of the multiple cavities positioned below the at least one heater.

3. The onboard battery according to claim 2, wherein a heat insulating material is disposed in the one of the multiple cavities formed in the bottom wall.

4. The onboard battery according to claim 3, wherein the heat insulating material is disposed in the one of the multiple cavities positioned below the at least one heater.

5. The onboard battery according to claim 3, wherein
a pair of attachment grooves that are opened in a direction in which the attachment grooves face each other are formed in the at least one disposition depression, and
both ends of the at least one heater are inserted into the pair of the attachment grooves by sliding the both ends, and the at least one heater is thereby disposed in the at least one disposition depression.

6. The onboard battery according to claim 3, wherein
the at least one heater is formed into a flat shape; and
that faces in an vertical direction a direction of the thickness of the at least one heater is aligned with a vertical direction.

7. The onboard battery according to claim 3, wherein
a cooling fan that causes cooling air to flow is provided in the at least one battery module, and
driving of the cooling fan is stopped when the at least one heater is driven.

8. The onboard battery according to claim 2, wherein
a pair of attachment grooves that are opened in a direction in which the attachment grooves face each other are formed in the at least one disposition depression, and
both ends of the at least one heater are inserted into the pair of the attachment grooves by sliding the both ends, and the at least one heater is thereby disposed in the at least one disposition depression.

9. The onboard battery according to claim 2, wherein
the at least one heater is formed into a flat shape; and
that faces in an vertical direction a direction of the thickness of the at least one heater is aligned with a vertical direction.

10. The onboard battery according to claim 2, wherein
a cooling fan that causes cooling air to flow is provided in the at least one battery module, and
driving of the cooling fan is stopped when the at least one heater is driven.

11. The onboard battery according to claim 1, wherein a heat insulating material is disposed in the one of the multiple cavities formed in the bottom wall.

12. The onboard battery according to claim 11, wherein the heat insulating material is disposed in the one of the multiple cavities positioned below the at least one heater.

13. The onboard battery according to claim 11, wherein
a pair of attachment grooves that are opened in a direction in which the attachment grooves face each other are formed in the at least one disposition depression, and
both ends of the at least one heater are slid and inserted into the pair of the attachment grooves by sliding the both ends, and the at least one heater is thereby disposed in the at least one disposition depression.

14. The onboard battery according to claim 11, wherein
the at least one heater is formed into a flat shape; and
that faces in an vertical direction a direction of the thickness of the at least one heater is aligned with a vertical direction.

15. The onboard battery according to claim 11, wherein
a cooling fan that causes cooling air to flow is provided in the at least one battery module, and
driving of the cooling fan is stopped when the at least one heater is driven.

16. The onboard battery according to claim 1, wherein
a pair of attachment grooves that are opened in a direction in which the attachment grooves face each other are formed in the at least one disposition depression, and
both ends of the at least one heater are slid and inserted into the pair of the attachment grooves by sliding the both ends, and the at least one heater is thereby disposed in the at least one disposition depression.

17. The onboard battery according to claim 1, wherein
the at least one heater is formed into a flat shape that faces in an vertical direction.

18. The onboard battery according to claim 1, wherein
a cooling fan that causes cooling air to flow is provided in the at least one battery module, and
driving of the cooling fan is stopped when the at least one heater is driven.

* * * * *